S. D. Locke,
Grain Binder.
No. 97,532. Patented Dec. 7, 1869.
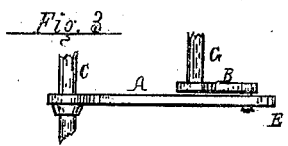
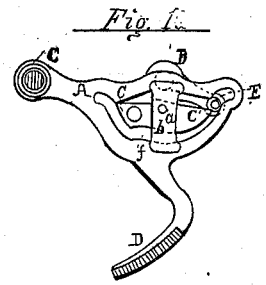
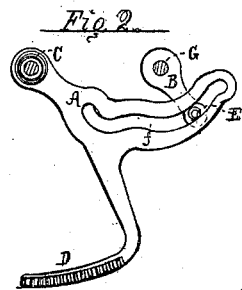
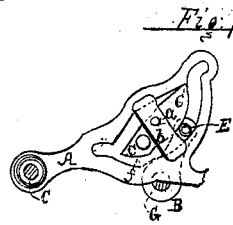
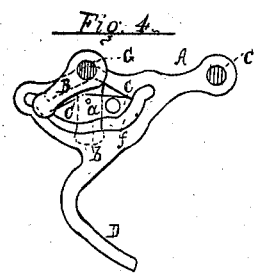
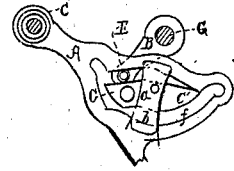
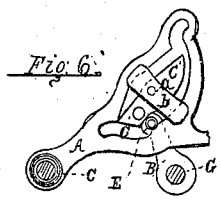
Witnesses: S. A. Skinner, J. L. Lambert
Inventor: Sylvanus D. Locke

UNITED STATES PATENT OFFICE.

SYLVANUS D. LOCKE, OF JANESVILLE, WISCONSIN.

IMPROVEMENT IN GRAIN-BINDERS.

Specification forming part of Letters Patent No. 97,532, dated December 7, 1869.

CASE B.

*To all whom it may concern:*

Be it known that I, SYLVANUS D. LOCKE, of the city of Janesville, Rock county, Wisconsin, have invented certain new and useful Improvements in Grain-Binders; and I do hereby declare that the following is a full, clear, and exact description thereof, reference being had to the accompanying drawings, making a part of this specification, in which—

Figure 1 is a side view thereof. Fig. 2 is also a side view, showing a different form of the cam-groove and cam-arm. Fig. 3 is a top view of the same, as shown in Fig. 1. Fig. 4 is a view of the side opposite to that shown in Fig. 1; and Figs. 5, 6, and 7 are side views similar to Fig. 1, showing the position and movements of the cam-block during a revolution of the crank.

The nature of my invention relates to a new and improved mode of constructing and operating the twisting or tying arm for operating a twisting or tying device, and consists in the employment of the devices hereinafter more fully described.

To enable others skilled in the art to make and use my invention, I will proceed to describe its construction and operation.

In the drawings, A represents the cam-arm, that is pivoted or takes bearing on a pin or shaft, c, attached to any suitable frame or support. This cam-arm is provided with a cam-groove, f, in which plays the wrist-pin E of the crank B, that is attached to the shaft G. The shaft G may be the main operating-shaft of the grain-binder, or any other, as is most convenient. Attached to the cam-arm, or extending from any point thereof, is a twisting or tying arm, D, that has its end or lower portion extending out in the arc of a circle described from the pivot-point of the cam-arm as a center. On either face of the circular end of the tying or twisting arm is a rack, as shown, that plays in a pinion for operating a revolving twisting or revolving tying device, or directly in the twisting-pinion itself. The wrist-pin E should be armed with a friction-roll, as shown. The cam-groove *f* may be of the simple form shown in Fig. 2, or of any form requisite to produce the desired movement of the twisting or tying arm. Where the crank B also operates the binding-arm, or arm that carries the tying or twisting mechanism, and the two arms are required to keep company during a portion of their respective movements, and then recede or approach each other to perform the tying or twisting, or where a greater or less movement of the tying or twisting arm is required than the plain cam-groove, Fig. 2, would produce, then, in these cases, I would make the cam-groove as shown in Figs. 1, 4, 5, 6, and 7—that is, with two grooves, continuous of each other, and separated by a gravitating cam-block, *c c'*, that, closing each groove after passage of the crank, controls the movement of the latter, and guides it up one side of the cam-block and back the other side. This cam-block is made with one end, as *c'*, heavier than the other, so as to cause it, when at rest or not acted upon by the crank, to assume the position shown in Figs. 1 and 6.

A spring instead of a weight may be employed to operate the cam-block. This cam-block is pivoted on a pin, *a*, that is set in a strap-piece, *b*, that spans the rear face of the cam-groove, as shown.

When in operation, if the crank B revolves in a right-hand direction, it finds, having arrived at the position shown in Fig. 1, that the cam-block has closed the entrance to the lower groove or lower portion of the cam-groove *f*, and that it is compelled to enter the upper groove, so driving down the cam-arm and operating the tying or twisting arm.

The crank, still turning to the right, soon leaves the upper groove and enters the lower, when the cam-block, falling, closes the entrance to the upper groove and compels it to remain in the lower, as shown in Fig. 6, in which it passes during the upward part of its movement, describing the positions shown in Figs. 6 and 7, until it arrives at the position shown in Fig. 1, when the cam-block again closes the lower groove, and the crank again passes through the upper as before, and so continuously, the crank during the lower portion of its circuit passing through the upper portion of the cam-groove, and during the upper portion of its circuit passing through the lower portion of the cam-groove.

In the case where the crank B is also required to operate the cam-arm that operates the binding-arm, it will be apparent, (still assuming the crank to revolve to the right, as before) that if the lower portion of the cam-groove *f* be made exactly like the cam-groove that operates the binding-arm, the tying or twisting arm will have exactly the same movement as the binding-arm while the crank is in that portion of the cam-groove, and the two arms will recede and then approach each other while the crank is in the upper groove.

It will also appear upon inspection that the movement of the cam-arm A, and consequently of the tying or twisting arm D, is much greater when the crank revolves to the right than that capable of being produced by the simple cam-groove, and when the crank revolves to the left, much less. Indeed, with the double cam groove and cam-block, as shown, the cam-arm may be made to describe (as where the crank turns to the right) more than one-third of a circle—a result impossible with the plain cam-groove.

What I claim is—

The arrangement of the cam-arm A, pivoted as described, with the cam-block *c c'*, substantially as and for the purpose described.

SYLVANUS D. LOCKE.

Witnesses:
S. A. SKINNER,
J. L. LAMBERT.